United States Patent [19]

Cyr et al.

[11] Patent Number: 5,559,943

[45] Date of Patent: Sep. 24, 1996

[54] METHOD AND APPARATUS CUSTOMIZING A DUAL ACTUATION SETTING OF A COMPUTER INPUT DEVICE SWITCH

[75] Inventors: Clark R. Cyr, Redmond; Jon B. Kimmich; Timothy T. Brewer, both of Bellevue; Jeffrey S. Hanson, Woodinville; Miles Richardson, Renton; Kenneth R. Robertson, Redmond; Cheryl Jenkins, Seattle; Brenda L. Diaz, Redmond; John G. Pierce, Vashon; Gregory Lee, Redmond, all of Wash.

[73] Assignee: Microsoft Corporation, Redmond, Wash.

[21] Appl. No.: 266,177

[22] Filed: Jun. 27, 1994

[51] Int. Cl.[6] .................................................. G06F 3/14
[52] U.S. Cl. ................................. 395/155; 345/145
[58] Field of Search ........................... 395/155, 161, 395/159, 157, 156, 154; 345/145

[56] References Cited

U.S. PATENT DOCUMENTS 5,018,082  5/1991  Obata et al. ..................... 395/154
5,333,272  7/1994  Capek et al. ..................... 395/275
5,363,481  11/1994  Tilt ................................. 395/156
5,473,343  12/1995  Kimmich et al. .................. 345/145

OTHER PUBLICATIONS

Cowart, Mastering Windows™ 3.1 Special Edition, Sybex, Inc., 1993, pp. 165–167, 688–689.

*Primary Examiner*—Mark R. Powell
*Assistant Examiner*—Crescelle N. dela Torre
*Attorney, Agent, or Firm*—Seed and Berry LLP

[57] ABSTRACT

A method and computer system present a user with a target icon on a computer screen and instruct the user to place a cursor thereon and twice actuate a mouse switch. The method measures the positions of the cursor on the screen during, and the time between, the two actuations by the user, and uses these measurements to customize, for the given user, the dual actuation speed and cursor movement area used to determine a double-click input command.

17 Claims, 3 Drawing Sheets

METHOD AND APPARATUS CUSTOMIZING A DUAL ACTUATION SETTING OF A COMPUTER INPUT DEVICE SWITCH

TECHNICAL FIELD

The present invention relates to customizing, for a particular user, a dual actuation setting for an input switch to a computer.

BACKGROUND OF THE INVENTION

As is known in the art, a cursor on a computer screen can be used to input commands into a computer. The cursor contains a hot point that indicates the location of the cursor itself. A user can input commands to move the cursor on the screen, thus moving the hot point, by using keyboard arrow keys or a pointing device such as a mouse or trackball.

By moving the cursor and placing the hot point on a particular portion of the screen, commands can be entered into the computer. For example, a computer may have a software program that includes pull-down menus. By placing the hot point of the cursor on a pull-down menu and actuating or "clicking" a switch or button (usually on the pointing device) once, a menu is displayed on the screen from which a user may enter commands. Similarly, by placing the hot point of the cursor on an icon, file name, menu selection, or other object on the screen and clicking the button once, a command can be entered to open or act upon a file or application program that is represented by the icon, file name, menu selection or other object. This method of command selection is commonly known as "point and click" and is commonly performed using computer pointing devices such as mice or trackballs. Overall, the point-and-click method of command selection allows users to more easily operate computers.

In another method of command selection, a user places the hot point of the cursor on an object on the screen and rapidly actuates the button twice or "double clicks." This double-click method of command input provides another command to the computer instructing the computer to act upon the object. For example, a particular software application may be represented by an icon on the screen. A user may initiate or launch the software application by placing the hot point of the cursor on the icon, and while holding the hot point thereon, double clicking the mouse button.

The computer, under direction of operating system software, includes an established time period within which the two button actuations of a double click must occur (.i.e., the "double-click speed"). If the user wishes to employ the double-click command on a particular object on the screen, the user must twice actuate the button within the established time period. If the user double clicks the button too slowly, the computer will not interpret such double clicking as the desired double-click command. Users frequently have difficulty double clicking the button on the pointing device within the established time period.

Some software methods are available that allow a user to adjust the double-click speed. One or these prior methods includes three selectable time periods allowing the user to adjust the double-click speed between slow, medium and fast speeds. Other prior methods such as the mouse manager routine provided in Version 3 of the MICROSOF® WINDOWS™ operating system, manufactured by Microsoft Corporation, provides for a variable double-click speed adjustable by the user by means of a slider bar that can be positioned between slow and fast double-click speed positions. Some of these prior methods also provide visual feedback to the user to indicate the double-click speed selected by the user.

Users, however, are often unable to determine if the double-click speed which they have selected is appropriate liar their particular rate of double clicking the button on the pointing device. For the prior method that provides three selectable time periods, users may double click at a particular rate between the three speeds provided. For the prior method that provides variable speeds, users can only set the double-click speed to their particular rate based on a series of trial and error attempts. Additionally, the users' double-click speed may change over a period of time while they use the computer, and thus the previously set double-click speed may no longer be sufficient for their changed speed.

A computer, under direction of the operating system software, also includes an established area within which the hot point can move during the time period for the computer to interpret the user's input as a double-click command. For example, for a user to enter commands into the computer under the double-click command, the hot point of the cursor must be placed on a particular icon and the cursor remain almost stationary while the button is double clicked. Typically, the established area is a small square area four pixels per side For computers employing a bitmap method of displaying images on the screen. If the user moves the cursor outside of the established area during an attempt to employ the double-click command, the computer will recognize the user's input as some input other than the double-click command. No prior method apparently, provides a means for adjusting the area within which the hot point can move during the double-click command.

SUMMARY OF THE INVENTION

According to principles of the present invention, a method customizes a selected input time period between a dual actuation of a switch on a pointing device. Dual actuation of the switch within the selected input time period provides a selected input to a computer and the selected input time period has a preselected setting. The method is for particular use in a computer system having a computer with a display and pointing devices coupled thereto, the display device displaying a cursor and the pointing device providing switch signals to the computer. The method includes the steps of: (i) displaying an object on the display device: (ii)moving the cursor to the object: (iii)actuating the switch to produce a first actuation signal: (iv)actuating the switch to produce a second actuation signal: (v) determining a time interval between the first and second actuation signals: and (vi)resetting the selected time period to the determined time interval.

The selected input to the computer also preferably requires that the cursor stay within a preselected distance on the screen during the dual actuation of the switch. Therefore, the method also includes the steps of: (vii) storing a first location of the cursor on the display device after the step of actuating the switch to produce the first actuation signal: (viii) storing a second location of the cursor on the display device after the step of actuating the switch to produce the second actuation signal: (ix) comparing the first and second locations of the cursor to produce a calculated distance; and (x) setting the preselected distance the cursor can move to the calculated distance.

DETAILED DESCRIPTION OF THE PRESENT PREFERRED EMBODIMENT

As described in detail below, the present invention provides a method that presents a user with a target icon on a computer screen and instructs the user to place a cursor thereon and twice actuate a mouse switch. The method measures the positions of the cursor on the screen during, and the time between, the two actuations by the user, and uses these measurements to customize, for the given user, the dual actuation speed and cursor movement area used to determine a double-click command.

Figure 1:
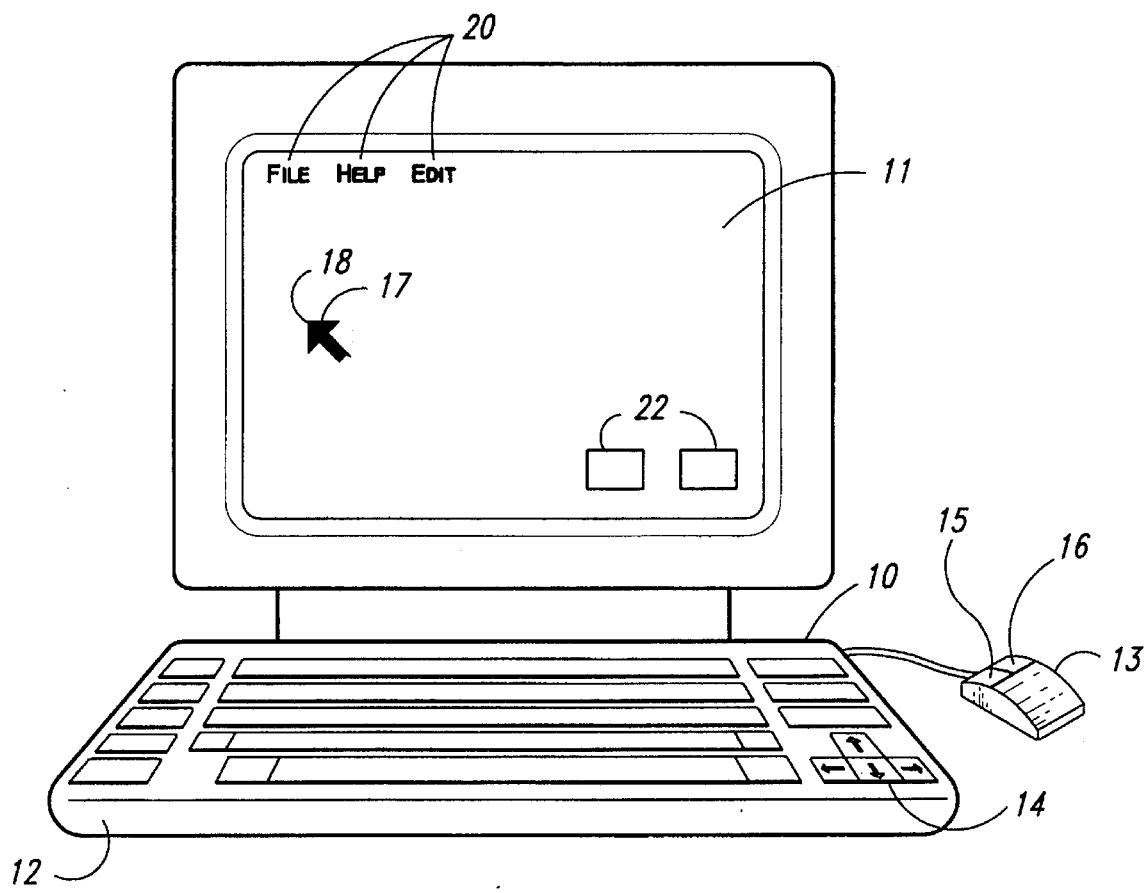
FIG. 1 is an isometric view of a computer showing a cursor displayed on a computer screen in accordance with the present invention.

FIG. 1 illustrates a computer 10 having a visual display screen 11, a keyboard 12, and a pointing device, such as a mouse 13 or trackball, all of which are coupled to the computer. The computer 10 includes a central processing unit ("CPU"), memory and other hardware and software features (not shown) that are associated with most currently available computers. The screen 11 provides a visual display output to a user. The mouse 13 includes primary and secondary momentary switches 15 and 16, respectively. The keyboard. 12 includes cursor movement keys 14 that provide signals to the computer for moving a cursor 17 displayed on the screen 11. Similarly, the mouse 13 provides commands or signals to the computer 10, including cursor movement signals produced by moving the mouse across a work surface and switch signals produced by actuating the primary or secondary switches 15 or 16.

Figure 3:
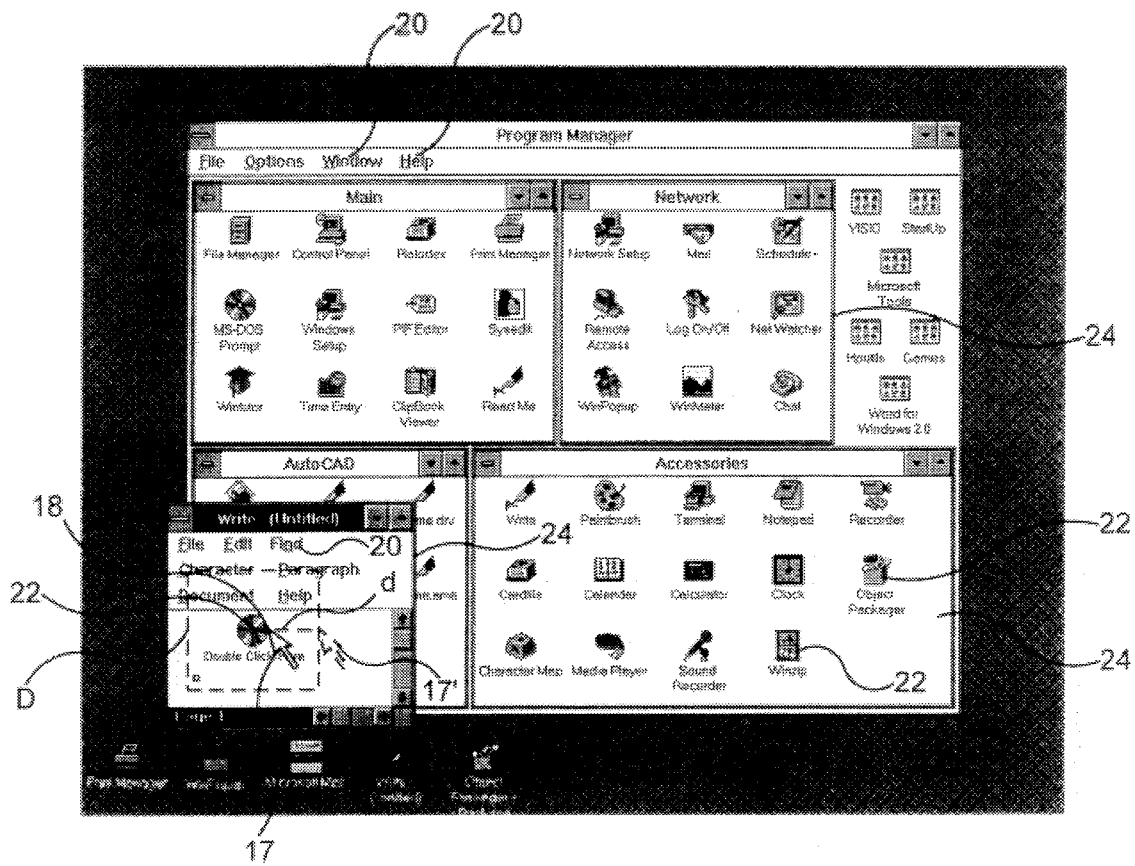
FIG. 3 is a front view of a computer screen illustrating the routine of FIG. 2.

The cursor 17 includes a hot point 18. While the cursor 17 is shown as an arrow and the hot point 18 as the point of the arrow, various other types of cursors may be used that are particular to a given computer software application. The hot point 18 is the active portion of the cursor 17 for entering commands into the computer 10. By placing the hot point 18 of the cursor 17 on an object on the screen 11, such as a pull-down menu 20, an icon 22 or a window 24 (as shown in FIG. 3), the cursor may be used to input commands into the computer 10 by clicking or double clicking one of the primary or secondary switches 15 or 16 (usually the primary switch).

The mouse 13 preferably outputs the switch and cursor movement signals to the computer 10 in a given form, such as a 3-byte signal. The first byte in the 3-byte signal includes data indicating actuation of the primary and secondary switches 15 and 16, while the second and third bytes include movement signals indicating movement of the mouse 13 in x and y directions, respectively. The 3-byte signal, and other signals produced by the mouse 13, are preferably similar to the mouse signals described in Microsoft Mouse Programmers Reference, Microsoft Press, 1991. The computer 10, under direction of appropriate software, converts the 3-byte signal into movements of the cursor 17 on the screen 11 and into user input commands.

For example, the computer 10 preferably includes the MICROSOFT® WINDOWS™ operating system software, manufactured by Microsoft Corporation. The MICROSOFT® WINDOWS™ software includes a subroutine for interpreting the cursor movement and switch signals from the mouse 13 and converting them into commands tier moving the cursor 17 and other user input commands including a selected input command based on dual actuation of the primary switch 15, referred to generally herein as the "double-click command." The subroutine also establishes two parameters which the user must satisfy for the computer 10 to interpret the user's input as the double-click command: (i) a time period during which the user must twice actuate or click the primary switch 15 on the mouse 13 (i.e.. the double-click speed), and (ii) an area in which the hot point 18 of the cursor 17 must be maintained during the double clicking of the primary switch 15, referred to generally herein as the "double-click area."

Figure 2:
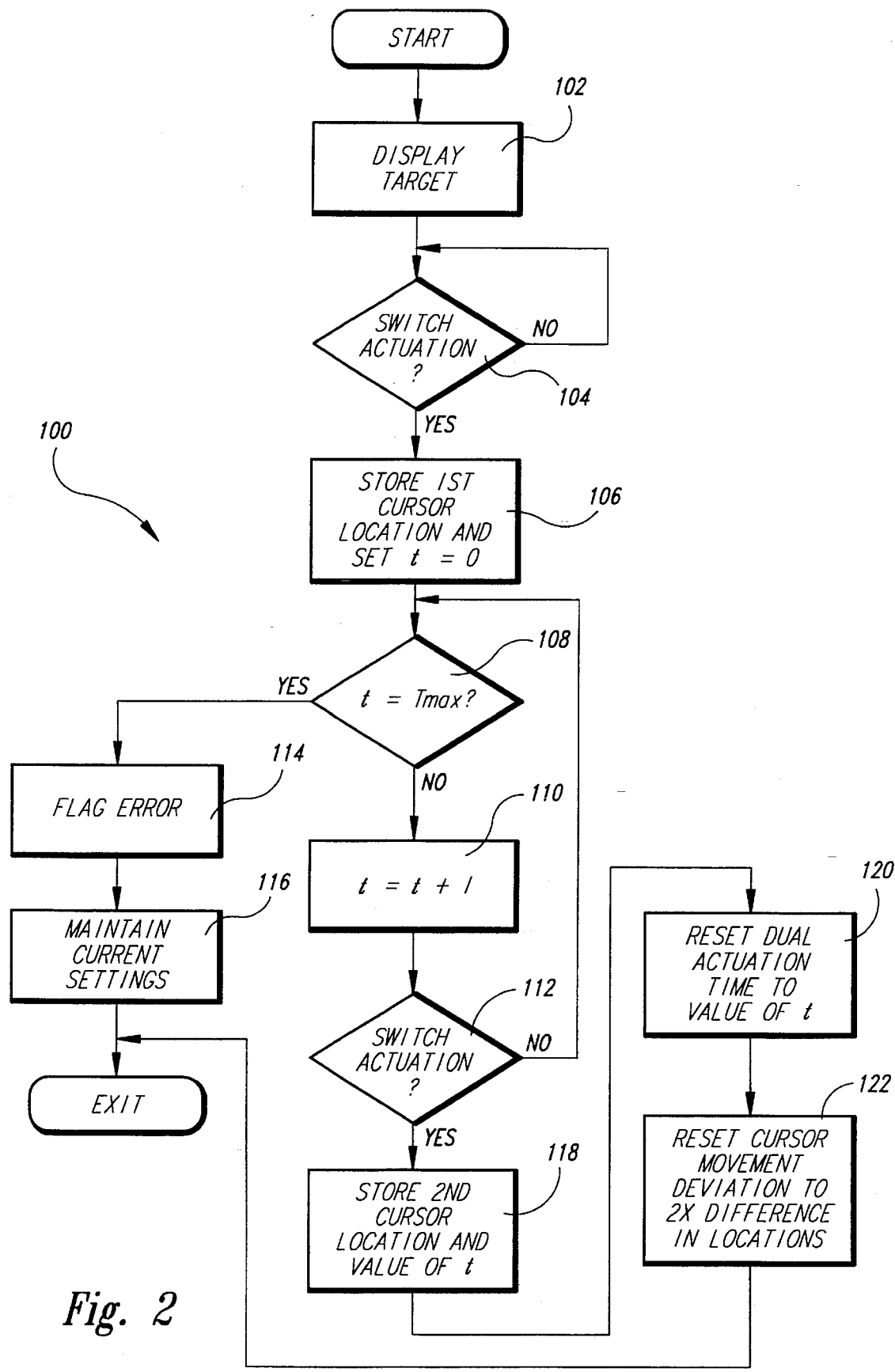
FIG. 2 is a flowchart illustrating a routine carried out according to general principles of the present invention.
Figure 4:
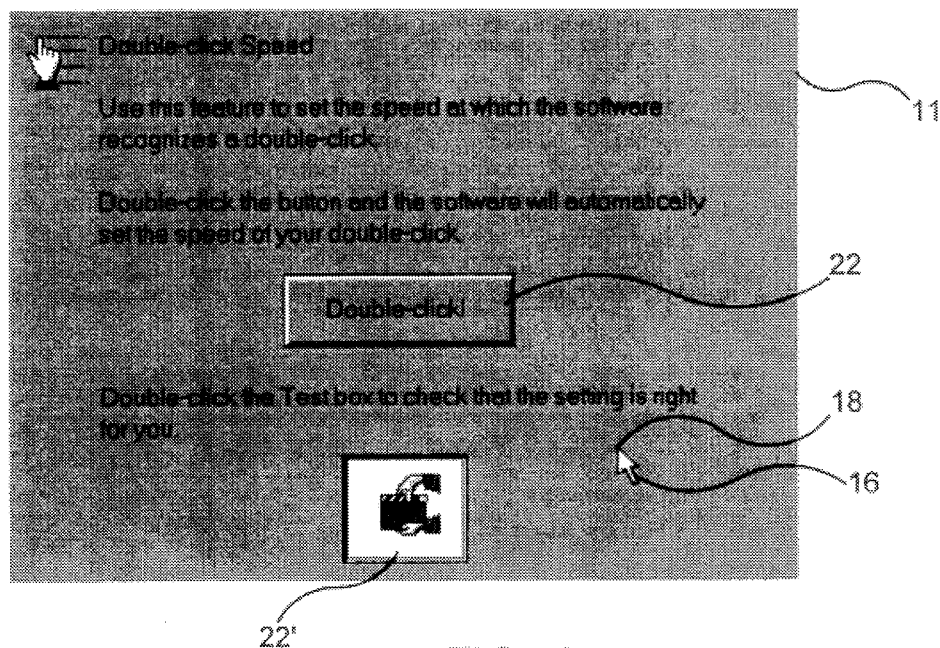
FIG. 4 is a front view of an alternative computer screen illustrating the routine of FIG. 2.

FIG. 2 is a flowchart diagram illustrating the main steps carried out under a routine 100 of the present invention for automatically customizing the double-click speed and double-click area settings by a given user of the mouse 13. The user preferably begins the routine 100 by selecting an appropriate menu option displayed on the screen 11, by using known methods, such as selecting the menu option using the point-and-click method. Once initiated, the routine 100 begins in step 102 by displaying a target on the screen 11. The computer 10 preferably displays a target icon 22 (shown in FIG. 3) on the screen 11 in step 102 since user's customarily double click on icons. Under step 102, the computer 10 also preferably provides a visual or audio message to the user instructing the user to place the cursor 17 on the target icon 22 and to double click the primary switch 15. For example, FIG. 4 shows another target icon 22 as a button. The screen 11 in FIG. 4 explains the purpose of the routine 100 and instructs the user to double click on the button.

In step 104, the routine 100 waits for the user to actuate the primary switch 15 while the hot point 18 of the cursor 17 is on the target icon 22, as indicated by the computer 10 receiving a first switch signal and cursor movement signals indicating that the hot point is on the icon. The user must first place the hot point 18 of the cursor 17 on the target icon 22 and then actuate the primary switch 15 under step 104. If the user actuates the primary switch 15 while the hot point 18 of the cursor 17 is not on the target icon 22, then the routine 100 continues to wait for the first switch while the hot point is on the icon. After receiving the first switch signal in step 104 while the hot point 18 is on the target icon 22, the computer 10, in step 106, stores a first location of the hot point in memory. The cursor location includes x and y Cartesian coordinate positions corresponding to locations on the screen 11. Additionally, in step 106, the computer 10 sets a current value t of a timer to 0.

In step 108, the computer 10 determines if the current time value t is equal to a preselected maximum time value $T_{max}$. $T_{max}$ is preferably equal to a a maximum double-click speed. e.g., about two seconds. In step 110, the computer 10 increments the current time value by a fixed amount, such as one microsecond. In step 112, the con, purer 10 determines if a second actuation of the primary switch 15 is received from the mouse 13. If the computer 10 does not receive a second switch message from the mouse 13 in step 112, then the routine 100 loops back to step 108 where the computer determines if the current time value t is equal to $T_{max}$, and then increments the value of the time value t in step 110 by 1 microsecond. The user must actuate the primary switch 15 a second time as the routine 100 loops through the steps 108, 110, and 112 before the maximum time value $T_{max}$, irrespective of the location of the cursor 17 on the screen 11.

If the routine 100 loops through the steps 108, 110 and 112 a sufficient number of times so that the current value t is incremented to equal the maximum time value $T_{max}$ in step 108, then in step 114. The computer 10 flags the user's failure to actuate the primary switch 15 within the maximum time interval $T_{max}$ as an error. The computer 10 can also display an error message on the screen 11 in step 114 indicating to the user that the user has failed to double click on the target icon 22 within the maximum time period. Thereafter, in step 116, the computer 10 maintains the current double-click speed and double-click area settings either previously set under prior operation of the routine 100 or established in the operating system software, and the computer exits the routine.

If the computer 10 receives a second actuation of the primary switch 15 before the maximum time period $T_{max}$ in step 112, then in step 118, the computer stops the timer and stores the value at which the current value t has been incremented as a total time value $t_{Tot}$. In step 118, the computer 10 also stores the current location of the hot point 18 on the screen 11. The user will likely have unintentionally moved the hot point 18 of the cursor 17 because the user moves the mouse 13 between the time of the first and second switch actuations, and thus, the location of the cursor stored in step 118 will likely differ from the location of the cursor stored in step 106. For example, during actuation of the primary switch 15, the user's finger or hand motion will often move the mouse 13, causing the hot point 18 of the cursor 17 to similarly move. FIG. 3 shows a cursor 17' in dashed lines indicating a different location of the cursor on the screen 11 when the computer 10 receives the second switch actuation under step 112. Under the routine 100, the cursor 17 may move to any location on the screen 11 after the computer 10 receives the first switch actuation.

In step 120, the computer 10 resets the double-click speed to the time value $t_{Tot}$ and stores the reset value in memory. The time value $t_{Tot}$, as incremented through steps 108, 110 and 112, represents the time it took the user to twice actuate the primary switch 15, and thus becomes the customized double-click speed for that user. Specifically, the time value $t_{Tot}$ is the total time between when the user depresses the primary switch 15 during the first switch actuation in step 104, and when the user releases the primary switch after the second switch actuation in step 112.

In step 122, the computer 10 compares the change in the cursor's location based on the first and second cursor locations that were stored in steps 118 and 106. The computer 10 determines a distance d between the first and second cursor locations by using known techniques, such as the distance formula reproduced below:

$$d = \sqrt{(x_2 - x_1)^2 + (y_2 - y_1)^2}$$

where $x_1$ and $y_1$ correspond to the x and y locations of the first cursor location and $x_2$ and $Y_2$ correspond to x and y locations of the second cursor location. The computer 10 in step 122 then computes a new area D that is preferably square with each side being twice the value d (i.e., $D=(2d)^2$). The computer 10 then resets the double-click area to the new area D under step 122. FIG. 3 shows the distance between the first and second locations of the cursor (corresponding to the cursors 17 and 17'. Respectively) as the distance d, and the computed new area D. The new area D is preferably centered at the location of the hot point 18 whenever the user first actuates the primary switch 15. Any second actuation of the switch 15 within the area D during the time value $t_{Tot}$ will be recognized by the computer 10 as a double-click command.

The routine 100 can also provide visual feedback to the user that shows to the user, the user's double-click speed. The screen 11 shown in FIG. 4 includes a test icon 22', in the form of a clapper board. Instructions above the icon 22' instruct the user to double-click on the icon to check that the double-click setting is correct for the user. The icon 22' is preferably animated to demonstrate the user's double-click speed when the user invokes the double-click command on the icon.

In an alternative embodiment, the computer 10 under the routine 100 increases the total time value $t_{Tot}$ by some small factor such as ten percent (e.g., $t_{Tot} = 1.1 \, t_{Tot}$). The computer 10 similarly increases the distance d by ten percent mad then defines the square area D based on the increased value d (i.e., $D=(1.1*d)^2$). The routine 100 includes maximum values for the double-click speed (e.g., the value $T_{max}$) and double-click area (e.g., an area $D_{max}$). If the increased total time $t_{Tot}$ and the increased area D are greater than the maximum values $T_{max}$ and $D_{max}$ for the double-click speed and double-click area, respectively, then the computer 10 provides an error message to the user. Otherwise, the ten percent increase in the double-click speed and double-click area are used as the reset values under the routine 100 in steps 120 and 122.

As explained above, the routine 100 of the present invention allows a user to customize the double-click speed and area for the mouse 13 or other pointing device. Under the routine of the present invention, the routine presents the user with the target icon 22 or other object upon which the user customarily double clicks in order to produce the desired double-click command. The user double clicks on this icon, and the routine resets the double-click speed based on the speed at which the particular user double clicks the primary mouse switch 16. The routine similarly resets the double-click area based on the user's movement of the cursor during such double clicking. Once the routine 100 resets the double-click speed and area for a given user, the user's accuracy, productivity and satisfaction with the point-and-click method of command selection generally improve because the user may more readily invoke the double-click command when they so desire.

Those skilled in the art will recognize that the above-described invention provides a method of customizing the double-click speed and area a pointing device. Although specific embodiments of, and examples for, the present invention have been described for purposes of illustration, various equivalent modifications may be made without departing from the spirit and scope of the invention. For example, while the routine of the present invention is initiated upon an appropriate command by the user, a given software application may automatically adjust the double-click speed and area to each user whenever the application is initially operated by the user. Additionally, while the present invention is described as adjusting the double-click speed and area for a mouse, the present invention may be used to customize a dual actuation speed of any switch, or a user's movement of any object on a visual display device during given situations. Accordingly, the invention is not limited by the disclosure, but instead its scope is to be determined by reference to the following claims.

We claim:

1. In a computer system having a computer with a display device and a pointing device coupled thereto, the display device displaying a cursor and the pointing device having a switch and providing switch signals to the computer, a method of resetting a selected input time interval required between a pair of actuations of the switch by a user to provide a selected input to the computer, the selected input time interval having a preselected setting and the selected input requiring the cursor to stay within a preselected area on the display device, the method comprising the steps of:

displaying a target on the display device;

receiving a first switch signal produced by a first actuation of the switch by the user when the cursor is on the target;

storing a first location of the cursor on the display device upon receipt of the first switch signal;

starting a timer which provides a current time value;

if a second switch signal produced by a second actuation of the switch by the user is not received before the current time value reaches a predetermined time value, then maintaining the preselected setting and the preselected area;

if the second switch signal produced by the second actuation of the switch is received before the current time value reaches the predetermined time value, then performing the steps of:

storing the current time value;

storing a second location of the cursor on the display device;

comparing the first and second cursor locations;

producing an adjusted area based on the comparison of the first and second cursor locations;

resetting the selected input time interval from the preselected setting to the current time value; and resetting the preselected area to the adjusted area.

2. The method of claim 1 wherein the step of displaying a target displays an icon on the display device.

3. The method of claim 1 wherein the step of starting a timer starts a count up timer which regularly increments the current time value by a predetermined amount.

4. The method of claim 1 wherein the steps of storing first and second locations of the cursor each store x and y position coordinates of the cursor.

5. The method of claim 4 wherein the step of comparing the first and second cursor locations includes the step of producing a computed distance between the first and second cursor locations.

6. The method of claim 5 wherein the step of producing an adjusted area produces a square-shaped area having two times the computed distance per side.

7. The method of claim 1, further comprising the step of displaying an error message to the user following the step of maintaining the preselected setting and the preselected area.

8. In a computer system having a computer and display and pointing devices coupled thereto, the display device displaying a cursor and the pointing device having a switch and providing switch signals to the computer, a method of customizing a selected input time period and cursor movement distance occurring between a dual actuation of the switch, wherein dual actuation of the switch within the selected input time period and cursor movement distance provides a selected input to the computer, the selected input time period having a preselected setting, the method comprising the steps of:

displaying an object on the display device;

moving the cursor to the object;

actuating the switch to produce a first actuation signal;

actuating the switch to produce a second actuation signal;

determining a distance moved by the cursor between the first and second actuation signals;

determining a time interval between the first and second actuation signals;

resetting the selected input time period to the determined time interval; and setting the cursor movement distance as the determined distance.

9. The method of claim 8 wherein the selected input to the computer requires the cursor to stay within a preselected distance on the display device, and wherein the step of determining a distance moved includes the steps of:

storing a first location of the cursor on the display device after the step of actuating the switch to produce the first actuation signal;

storing a second location of the cursor on the display device after the step of actuating the switch to produce the second actuation signal; and comparing the first and second locations of the cursor to produce a calculated distance; and wherein the step of setting includes the step of setting the preselected distance the cursor can move to the calculated distance.

10. The method of claim 9 wherein the step of resetting the preselected distance the cursor can move resets the distance to a square-shaped area having two times the calculated distance per side.

11. The method of claim 8, further comprising the steps of:

starting a timer following the step of actuating the switch to produce the first actuation signal; and stopping the timer allowing the step of actuating the switch to produce the second actuation signal, and wherein the step of determining the time interval determines the time interval based on a current time value on the timer.

12. The method of claim 11, further comprising the steps of:

determining if the step of actuating the switch to produce the second actuation signal occurs before the current time value on the timer reaches a selected value; and maintaining the preselected setting if the current time value on the timer reaches the selected value before the step of actuating the switch to produce a second actuation signal.

13. The method of claim 12, further comprising the step of producing an error message when the current time value on the timer reaches the selected value.

14. The method of claim 12, further comprising the step of increasing the current time value by a selected factor.

15. The method of claim 14 wherein the selected factor is about 10%.

16. An apparatus for resetting a selected input time period and cursor movement distance occurring between a dual actuation of a switch on a pointing device, wherein dual actuation of the switch within the selected input time period and selected cursor movement distance corresponds to a selected input command, the apparatus comprising:

a computer having a screen;

a cursor displayed on the screen;

a target displayed on the screen;

a pointing device coupled to the computer and having a switch, the pointing device producing movement signals directing movement of the cursor in x and y directions and switch signals indicating actuation of the switch; and the computer being programmed to customize the selected input command by (i) starting a timer which regularly adjusts a current time value after receiving a first switch signal when the cursor is on the target, (ii) stopping the timer when the computer receives a second switch signal, and (iii) resetting the time period to the current time value on the timer, (iv) determining a distance moved by the cursor during the starting and stopping of the timer, and (v) setting a cursor movement distance to the determined distance moved by the cursor.

17. The apparatus of claim 16 wherein the computer is also programmed to (vi) store a first location of the cursor on the display device when the computer receives the first switch signal, (vii) store a second location of the cursor on the display device when the computer receives the second switch signal, (viii) produce an adjusted area based on the comparison of the first and second cursor locations, and (ix) set an area in which the cursor can move on the display device during the time period to the adjusted area for the computer to interpret the selected input command.

* * * * *